United States Patent
Özer et al.

(10) Patent No.: US 10,108,486 B2
(45) Date of Patent: Oct. 23, 2018

(54) ERROR PROTECTION

(71) Applicant: ARM LIMITED, Cambridge (GB)

(72) Inventors: Emre Özer, Cambridge (GB); Balaji Venu, Cambridge (GB)

(73) Assignee: ARM Limited, Cambridge (GB)

(*) Notice: Subject to any disclaimer, the term of this patent is extended or adjusted under 35 U.S.C. 154(b) by 23 days.

(21) Appl. No.: 14/850,992

(22) Filed: Sep. 11, 2015

(65) Prior Publication Data
US 2017/0075760 A1   Mar. 16, 2017

(51) Int. Cl.
*G06F 11/10* (2006.01)

(52) U.S. Cl.
CPC ...... *G06F 11/1012* (2013.01); *G06F 11/1076* (2013.01)

(58) Field of Classification Search
CPC .................................................. G06F 11/1012
See application file for complete search history.

(56) References Cited

U.S. PATENT DOCUMENTS

| | | | | |
|---|---|---|---|---|
| 4,277,845 A * | 7/1981 | Smith | ............ | H04B 7/22 340/7.24 |
| 4,413,339 A * | 11/1983 | Riggle | ............ | H03M 13/151 714/765 |
| 4,685,149 A * | 8/1987 | Smith | ............ | G01D 9/005 340/10.31 |
| 6,167,560 A * | 12/2000 | Jenkins, IV | ....... | H03K 19/1736 326/38 |
| 8,102,851 B1 * | 1/2012 | Mandin | ............ | H04L 25/4975 370/390 |
| 8,281,228 B2 * | 10/2012 | Geng | ............ | H04L 1/0057 714/755 |
| 2007/0157060 A1 * | 7/2007 | Ganga | ............ | H03M 13/33 714/752 |
| 2010/0070823 A1 * | 3/2010 | Geng | ............ | H04L 1/0057 714/752 |
| 2010/0199144 A1 * | 8/2010 | Li | ............ | H04L 1/0082 714/752 |
| 2015/0280746 A1 * | 10/2015 | Sikkink | ............ | H03M 13/17 714/762 |

* cited by examiner

*Primary Examiner* — Joseph D Torres
(74) *Attorney, Agent, or Firm* — Nixon & Vanderhye P.C.

(57) ABSTRACT

A state indicating value is encoded with a one-hot or one-cold encoding and each bit of the state indicating value is stored in a different portion of a storage element. Parity values are determined for each portion of the storage element and stored to a parity storage element. This allows errors caused by single event upsets or multi-bit upsets to be detected and corrected, with lower hardware cost compared to alternative approaches.

13 Claims, 10 Drawing Sheets

| A | State |
|---|---|
| 0 | State X |
| 1 | State Y |

FIG. 3

| A1 | A0 | State |
|---|---|---|
| 0 | 1 | State X |
| 1 | 0 | State Y |
| 0 | 0 | Illegal |
| 1 | 1 | Illegal |

ERROR PROTECTION

BACKGROUND

Technical Field

The present technique relates to the field of data processing. More particularly, it relates to protecting against errors.

Technical Background

A single event upset (SEU) is a phenomenon that occurs in storage elements such as static random access memory (SRAM) and flip-flops, which causes a single bit of a stored value to change state. A SEU may be caused by a particle, such as a cosmic ray from outer space or a particle or ion produced when a cosmic ray hits an atom in the Earth's atmosphere, striking a single bitcell or flip-flop used to store the state indicating value. Traditionally such particle strikes were a significant risk in electronics used for space applications where the device is intended to be used outside the Earth's atmosphere, but increasingly there are also some cases when terrestrial electronics may also need protection against single event upsets.

SUMMARY

At least some examples provide an apparatus comprising:

control circuitry to generate a first state indicating value according to a one-hot or one-cold encoding comprising a plurality of state indicating bits, and to store each state indicating bit of the first state indicating value in a different one of a plurality of portions of a storage element; and parity circuitry to determine a plurality of parity values each indicative of a parity of a corresponding one of said plurality of portions of the storage element, and to store the parity values to a parity storage element.

At least some examples provide an apparatus comprising:

means for generating a first state indicating value according to a one-hot or one-cold encoding comprising a plurality of state indicating bits, and for storing each state indicating bit of the first state indicating value in a different one of a plurality of portions of a storage element; and means for determining a plurality of parity values each indicative of a parity of a corresponding one of said plurality of portions of the storage element, and for storing the parity values to a parity storage element.

At least some examples provide an apparatus comprising:

read circuitry to read a plurality of state indicating bits of a first state indicating value from a storage element comprising a plurality of portions, each state indicating bit read from a different portion of the storage element, and to determine whether the first state indicating value has a valid encoding in which only one of the plurality of state indicating bits has a first bit value and one or more remaining state indicating bits have a second bit value; and error checking circuitry to detect, for each portion of the storage element, whether there is a mismatch between a parity of that portion of the storage element and a stored parity value corresponding to that portion of the storage element;

wherein in response to the read circuitry determining that the first state indicating value has an invalid encoding, the error checking circuitry is configured to determine as erroneous at least one state indicating bit stored in at least one portion of the storage element for which said mismatch is detected for the corresponding parity value.

At least some examples provide an apparatus comprising:

means for reading a plurality of state indicating bits of a first state indicating value from a storage element comprising a plurality of portions, each state indicating bit read from a different portion of the storage element, and for determining whether the first state indicating value has a valid encoding in which only one of the plurality of state indicating bits has a first value and one or more remaining state indicating bits have a second value; and means for detecting, for each portion of the storage element, whether there is a mismatch between a parity of that portion of the storage element and a stored parity value corresponding to that portion of the storage element, and in response to the means for reading determining that the first state indicating value has an invalid encoding, determining as erroneous at least one state indicating bit stored in at least one portion of the storage element for which said mismatch is detected for the corresponding parity value.

At least some examples provide a method comprising:

generating a first state indicating value according to a one-hot or one-cold encoding comprising a plurality of state indicating bits;

storing each state indicating bit of the first state indicating value in a different one of a plurality of portions of a storage element;

determining a plurality of parity values each indicative of a parity of a corresponding one of said plurality of portions of the storage element; and storing the parity values to a parity storage element.

At least some examples provide a method comprising:

reading a plurality of state indicating bits of a first state indicating value from a storage element comprising a plurality of portions, each state indicating bit read from a different portion of the storage element;

determining whether the first state indicating value has a valid encoding in which only one of the plurality of state indicating bits has a first bit value and one or more remaining state indicating bits have a second bit value;

detecting, for each portion of the storage element, whether there is a mismatch between a parity of that portion of the storage element and a stored parity value corresponding to that portion of the storage element; and in response to determining that the first state indicating value has an invalid encoding, determining as erroneous at least one state indicating bit stored in at least one portion of the storage element for which said mismatch is detected for the corresponding parity value.

At least some examples provide a non-transitory storage medium storing a program which, when executed by a data processing apparatus, controls the data processing apparatus to perform either of the methods described above.

Further aspects, features and advantages of the present technique will be apparent from the following description of examples, which is to be read in conjunction with the accompanying drawings.

DESCRIPTION OF EXAMPLES

Some specific examples are discussed below. It will be appreciated that the invention is not limited to these particular examples.

Figure 1:
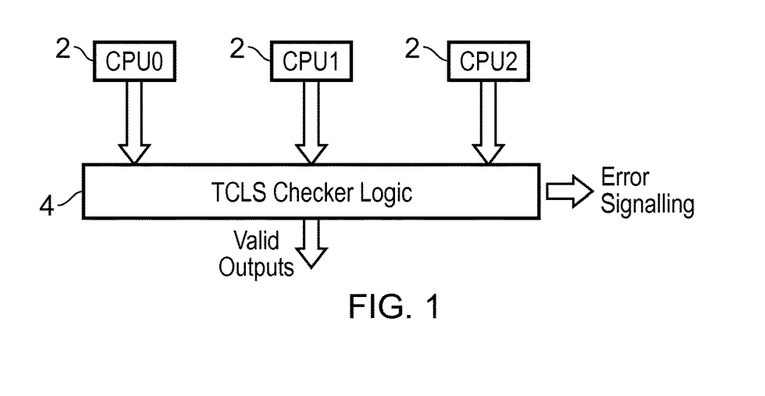
FIG. 1 shows an example of an apparatus with multiple redundant processing units executing the same processing to guard against errors.

FIG. 1 shows one approach for handling protection against single event upsets (SEUs). Some systems may provide three or more identical processor cores 2, which may each execute the same program in synchronisation with each other. The outputs of each processor may be passed to checker logic 4, which compares the outputs of the respective processors 2 and determines as a valid output the output determined by the majority of the processors 2. Hence, if a SEU causes an error in the output of one of the processors 2, the other two processors will still be correct and the checker logic 4 may detect the error and correct it by using the output of the other two processors. This allows for forward progress even if a single event upset occurs. However, this approach is expensive in terms of hardware because three times the amount of processing circuitry is required. For some applications, particularly space electronics, this added expense may be acceptable as SEUs are more common for electronics intended to be used outside the Earth's atmosphere and the consequences of an incorrect calculation on a spaceship or satellite may be severe.

Figure 2:
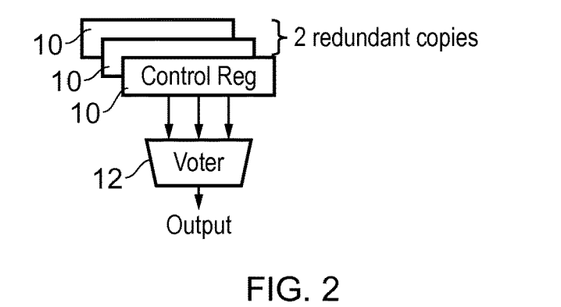
FIG. 2 shows an example of providing redundant control registers and voter logic to protect against single event upsets.

However, since the checker logic 4 is not triplicated, it is vulnerable to errors and may require some protection against a particle strike causing a SEU within the checker logic. The checker logic may be implemented as a state machine in micro-architecture and may be controlled using a set of control registers. To protect the checker logic 4 against SEUs, several redundant versions of each control register 10 can be provided, and voter circuitry 12 may compare the values in each control register 10 and output as the correct control data the value stored in the majority of the redundant control registers 10.

However, the triplication of the control register 10 and the provision of additional voter circuitry 12 increases the hardware overhead of the device which can be expensive in terms of circuit area and power consumption. Also, to reduce the likelihood of a particle strike causing bit flips in two or more of the control registers, which could lead to the incorrect result being selected by the voter logic, the control registers are typically placed far apart in the circuit layout, which increases circuit area and affects timings in routing the different control values across the chip to the voter logic. The approach discussed below provides a technique for protecting against SEUs and MBUs (multi-bit upsets) which is less expensive in terms of hardware.

The combination of using a one-hot or one-cold encoding together with parity values in the way discussed below enables SEUs to be protected against without needing to triplicate the storage element or provide voter logic. The technique can also guard against some forms of multi-bit upset (MBU) when multiple bits switch state due to a particle strike or other event. This is surprising since the use of one-hot or one-cold encoding, and the provision of parity values, would both appear to be techniques for detecting errors but would not be considered capable of identifying which particular bit in a state indicating value is erroneous and hence would not be considered by a skilled person to be suitable for correcting errors. However, the inventors recognised that by combining one-hot or one-cold encoding with parity values in the way discussed below, this enables errors to be both detected and corrected, so that the correct value can be restored without needing to provide multiple redundant storage elements.

Figure 3:
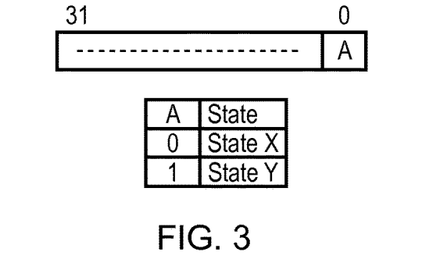
FIG. 3 shows an example of a binary encoding of a state indicating value.

FIG. 3 shows an example of a state indicating value encoded using a binary encoding. In a binary encoding, a state indicating value is represented using a given number of bits N where each bit can take a bit value of 0 or 1 and all possible combinations of 0s and 1s represent valid encodings of the binary value. This enables up to $2^N$ different values to be encoded.

Figure 4:
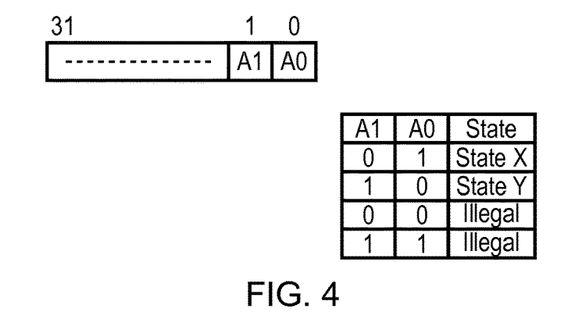
FIG. 4 shows an example of a one-hot encoding of a state indicating value.

In contrast, FIG. 4 shows an example of a one-hot encoding for a state indicating value. In a one-hot encoding, a given number of states M may be represented using a state indicating value having M bits. For a valid encoding, only one of those M bits can be 1 and all the other bits must be 0. Which particular bit has the value of 1 indicates which of the M states is represented by the state indicating value. For example, in the two-state encoding in FIG. 4, state X is indicated when bit A0 is 1, and state Y is indicated when bit A1 is 1. Any encoding of the first state indicating value in which all the bits are 0 or more than one bit is 1 is considered an invalid encoding.

Similarly, a one-cold encoding is an encoding in which valid encodings have only one bit set to 0 and all the other bits equal to 1. For a one-cold encoding, any encoding in which all the bits are 1, or in which more than one bit is 0, is an invalid encoding. The description below for conciseness will generally refer to use of a one-hot encoding, but it will be appreciated that a one-cold encoding could also be used.

Figure 5:
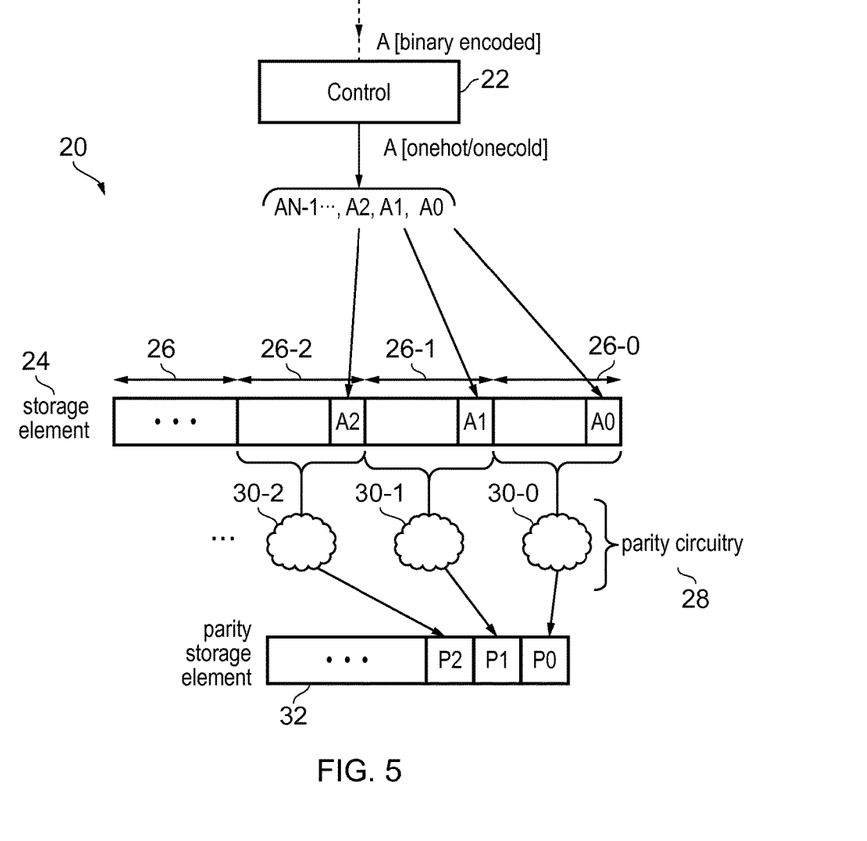
FIG. 5 shows an example of an apparatus comprising control circuitry for storing a first state indicating value in a format to protect against single event upsets and multi-bit upsets.

FIG. 5 shows an example of an apparatus 20 for generating and storing a state indicating value to protect against SEUS. The apparatus 20 includes control circuitry 22 for generating a state indicating value A having a one-hot encoding. The one-hot encoded value has a number of bits A0, A1, etc., of which only one of the bits is 1 and all the other bits are 0. The position of the bit equal to 1 represents the state indicated by the state indicating value A. In some cases the state indicating value A could be generated internally by the control circuitry 22. Alternatively, the control circuitry 22 could receive a binary encoded state indicating value representing the state as a binary number, and convert this into a one-hot encoded value.

The control circuitry 22 stores the one-hot encoded value A to a storage element 24 which includes a number of portions 26. Each bit A0, A1, A2 etc. of the state indicating value A is placed in a different portion 26 of the storage element 24. Hence, bit A0 is placed in a portion 26-0, bit A1 is placed in a portion 26-1, bit A2 is placed in a portion 26-2, and so on for each bit of the state indicating value.

The apparatus 20 also has parity circuitry 28 for generating a number of parity values each corresponding to one of the portions 26 of the storage element 24. For example the parity circuitry 28 includes a number of blocks 30 of parity generators which each generate a respective parity bit P0, P1, P2, etc. corresponding to a respective one of the portions 26 of the storage element 24. The generated parity values P0, P1, P2 etc. are stored in a parity storage element 32.

Each parity value represents the parity of the bit values in the corresponding portion 26 of the storage element 24. That is, the parity value represents whether there is an odd number or even number of bits with a value of 1 in the corresponding portion 26. Typically, when there are an even number of bits with value 1 in the corresponding portion 26 of the storage element, then the corresponding parity bit P is 0, and when there are an odd number of bits with a value 1 then the parity bit is 1 (although it will be appreciated that the opposite mapping with P=0 representing an odd number of '1' bits and P=1 representing an even number could also be used). For example, the parity bit may be determined by performing XOR operations to XOR all the bits in the corresponding portion 26 of the storage element 24 together to generate the parity bit. Hence, each parity generator 30 of the parity circuitry 28 may for example comprise a block of XOR gates for successively XORing each successive bit in the corresponding portion 26 with the result of the XOR from any previous bits in that portion 26 of the storage element 24.

Figure 6:
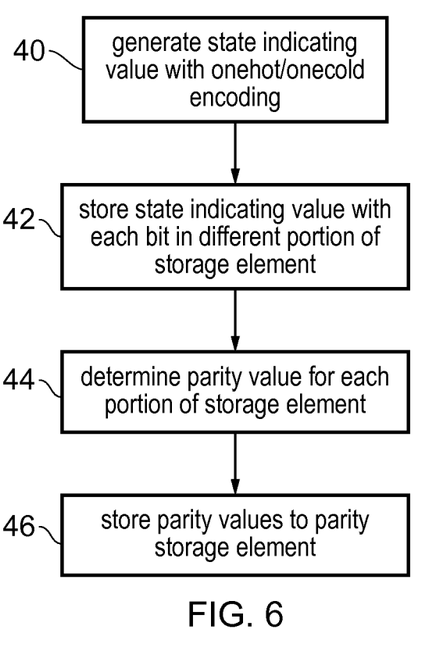
FIG. 6 shows a method of generating and storing the state indicating value.

FIG. 6 shows a method of generating and storing the state indicating value. At step 40 the control circuitry 22 generates the state indicating value with a one-hot (or one-cold) encoding. At step 42 the control circuitry 22 stores each bit of the state indicating value in a different portion 26 of the storage element 24. At step 44 the parity circuitry 28 determines a parity value P for each respective portion 26 of the storage element 24. At step 46 the generated parity values P are stored to the parity storage element 32.

Figure 7A:
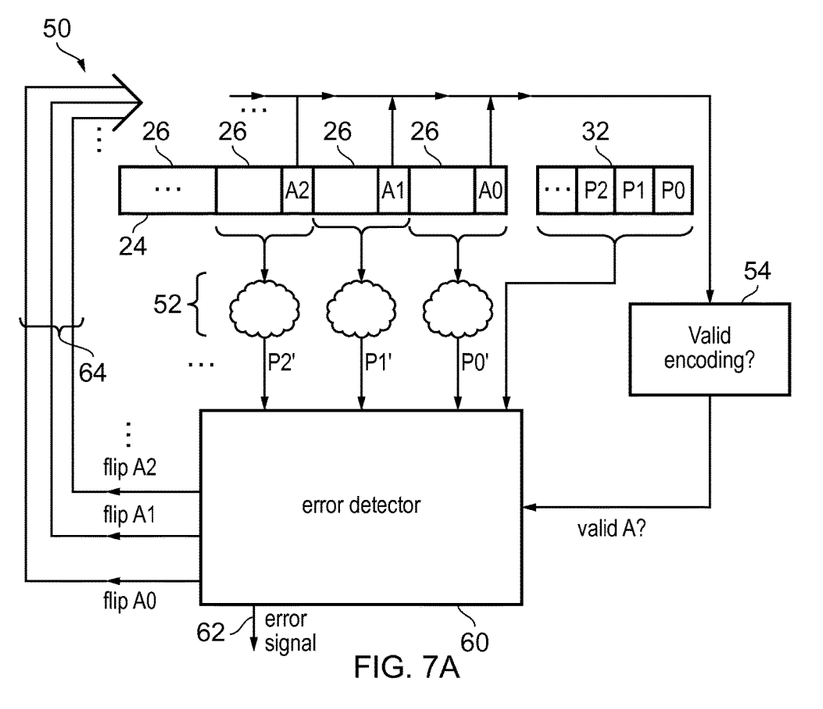
FIG. 7A shows an example of an apparatus comprising circuitry for detecting and correcting errors in the state indicating value.

FIG. 7A shows an example of an apparatus 50 having circuitry for detecting whether there is an error in the state indicating value A stored in the storage element 24 and correcting it if possible. The apparatus 50 comprises parity circuitry 52 for determining a set of parity bits P0', P1', P2' from the hit values stored in each portion 26 of the storage element in a corresponding way to the parity circuitry 28 of FIG. 5. The parity bits P' generated by parity circuitry 52 represent the detected parity of the values currently stored in the corresponding portions of the storage element 24, as opposed to the saved parity values P stored in parity storage element 32 which were generated by parity circuitry 28 upon storing the state indicating value A to the storage element 24. Hence, by comparing the detected parity bits P' with the stored parity bits P in parity storage element 32, any mismatch between these parity values can signal an error. The apparatus 50 also has encoding checking circuitry 54 for reading the respective state indicating bits A0, A1, A2 etc. of the state indicating value A from the storage element 24 and determining whether the state indicating value A has a valid encoding. For example, when a one-hot encoding is used, the encoding checking circuitry 54 may determine whether only one bit of the state indicating value A is 1, and signal an invalid encoding if there are zero, two or more bits with a value of 1.

The stored parity values P from the parity storage element 32, the detected parity values P' generated by parity circuitry 52, and an indication of whether the encoding of state indicating value A is valid from the encoding checker 54, are all provided to error detector 60 which determines whether there is an error and how to correct it based on these inputs. The error detector 60 generates an error signal indicating whether there is an error detected, and a series of error correcting signals 64 for triggering correction of individual bits of the state indicating value A. The encoding checker 54 and error detector 60 may collectively be considered to be error checking circuitry.

Figure 8:
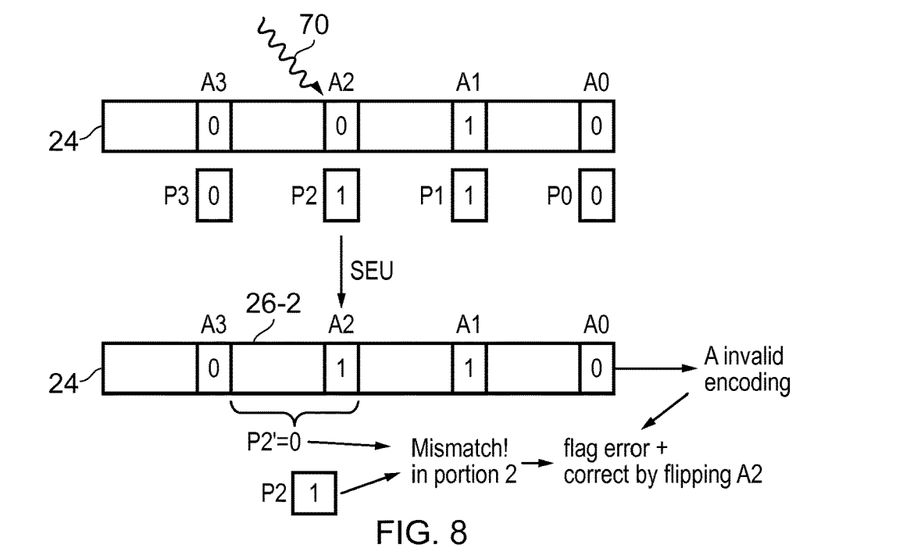
FIG. 8 shows an example of correcting an error caused by a single event upset in the state indicating value.

FIGS. 8 to 11 illustrate techniques for handling different types of errors which may be detected. FIG. 8 shows an example where a particle 70 strikes and causes a bit flip in hit A2 of the state indicating value. This is a single event upset because only one bit changed state. The encoding checker 54 detects that the state indicating value A has an invalid encoding, because now there are two bits A1, A2 of the state indicating value A equal to 1. The error detector 60 detects that there is a parity mismatch for the second portion 26-2 of the storage element 24, because the bit flip caused by the particle strike means the stored parity value P2 does not match the detected parity value P2'. The error detector 60 can both detect that there is an error, and pinpoint which bit of the state indicating value is erroneous, because the parity values allow the error to be identified as occurring within portion 26-2, and the invalid encoding of A identified by encoding checker 54 shows that the error lies within the value A, and so the erroneous bit is identified as bit A2. The error signal 62 can be generated to flag that there is an error, and also one of the error correcting signals 64 corresponding to bit A2 can be asserted to trigger bit A2 to flip states (so that it switches back from 1 to 0) to correct the error.

Figure 9:
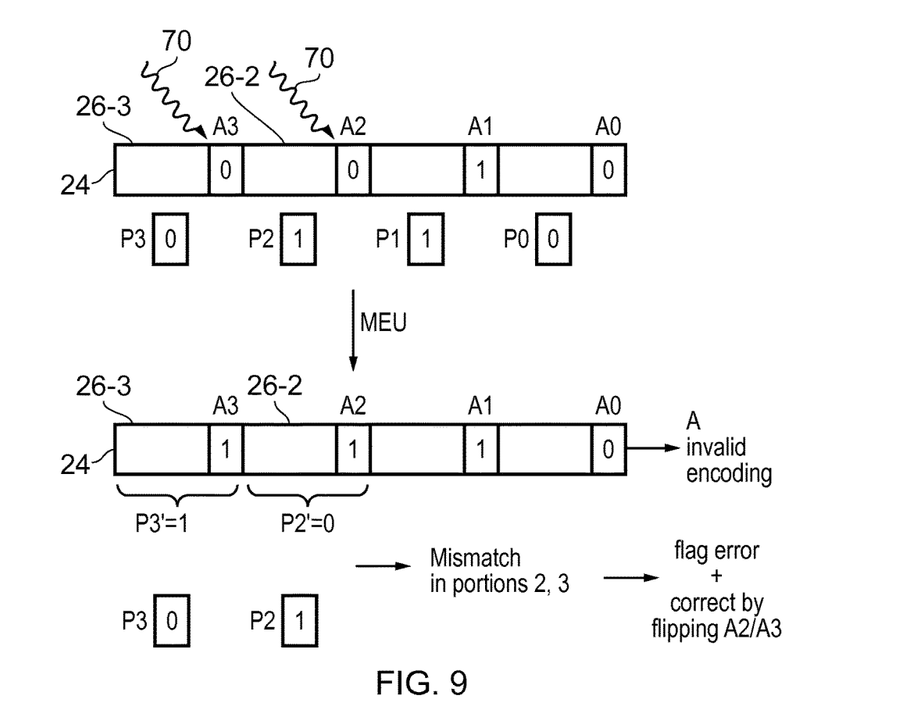
FIG. 9 shows an example of correcting an error caused b a multi-bit upset in the state indicating value.

FIG. 9 shows an example of detecting and correcting an error caused by a multi-bit upset (MBU). This time particle strikes 70 cause bit flips in both bits A2 and A3 of the state indicating value A. As value A now has an invalid encoding with three bits equal to 1, and mismatching parity values are detected for portions 26-2, 26-3 of the storage element 24, the error can be identified as occurring in bits A2 and A3 of the state indicating value A and corrected by flipping the states of both bits A2, A3. Hence, the present technique also enables detection and correction of MBUs which cause the state indicating value A to transition to an invalid encoding.

Figure 10:
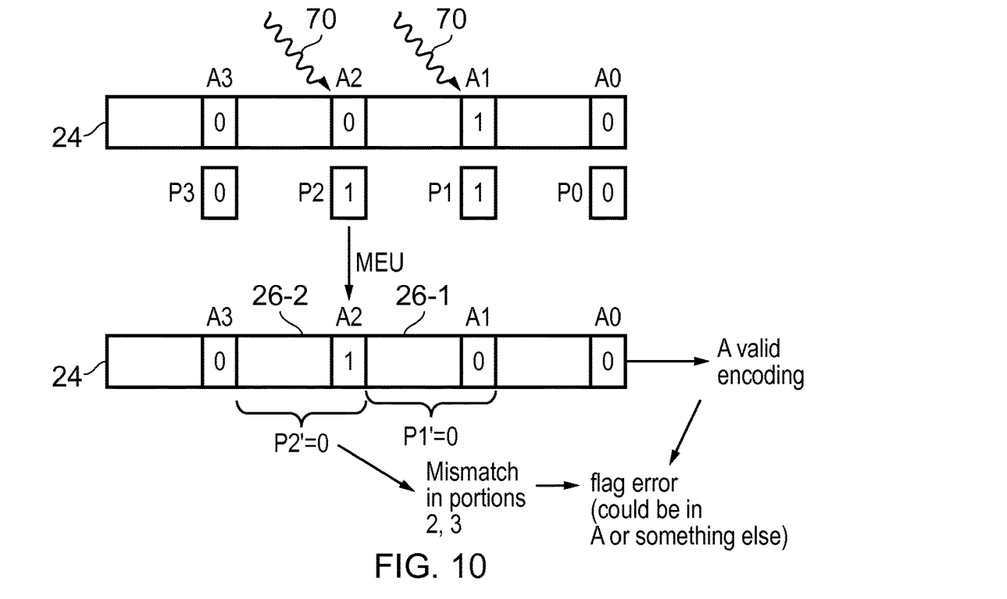
FIG. 10 shows an example of detecting an error caused by a multi-bit upset.

FIG. 10 shows an example where a MBU causes bit flips in bits A1, A2 of the stored state indicating value, but this time this causes a transition from one valid encoding to another valid encoding (as following the bit flips A still has only one bit equal to 1). In this case, although the error detector 60 can determine from the mismatching parity bits in portions 26-1, 26-2 that there is an error, and flag the error accordingly by generating the error signal 62, the error cannot be corrected simply by flipping bits of the storage element 24 because the valid encoding of A means that the MBU case shown in FIG. 10 where two bits of the state indicating value A swap states cannot be distinguished from an error in occurring in a bit of portions 26-1, 26-2 other than those used to store the state indicating bits A1, A2 of the state indicating value A. For example, the same result could have occurred if the correct state indicating value had A1=0, A2=1 all along, and the particle strikes 70 caused bit flips in one of the other bits of portions 26-1, 26-2. Therefore, the error can be handled in a different manner. For example, the error detector 60 may trigger a reset of the processing device which uses the stored state indicating value, trigger an entry to a mode for handling more serious errors, or trigger the processing device to restart processing from an earlier saved state.

Figure 11:
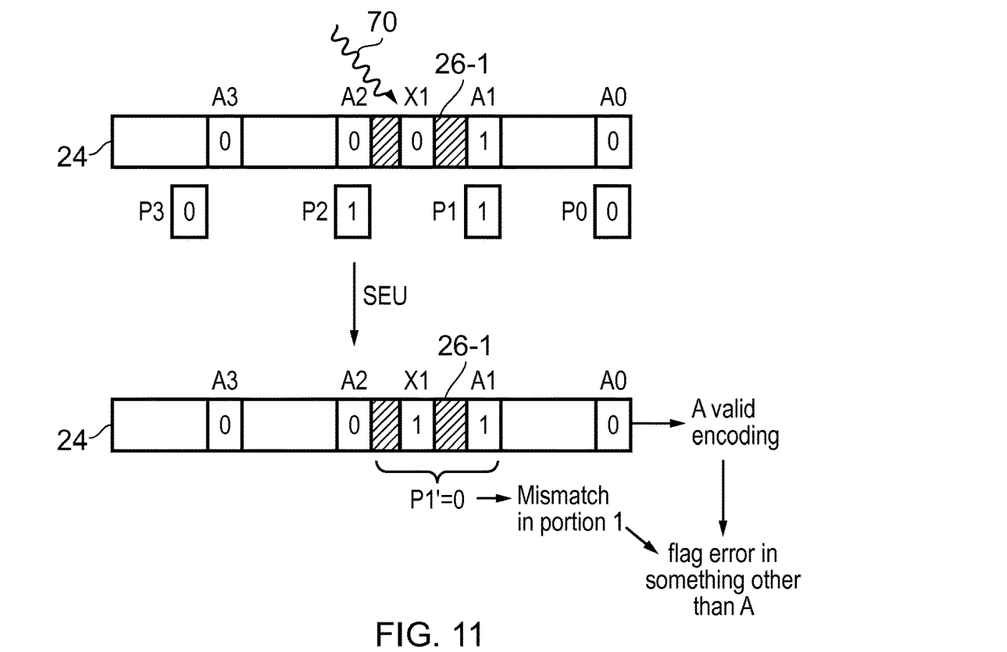
FIG. 11 shows an example of detecting an error caused by single event upset in a stored value other than the state indicating value encoded according to the technique shown in FIG. 5.

FIG. 11 shows an example of an SEU occurring in a bit X1 of the storage element 24 other than one of the bits A0 to A3 of the state indicating value A. In this case, since the error occurs in a bit which has not been encoded with the one-hot or one-cold encoding, then while the mismatching parity value P1 for portion 26-1 of the storage element allows the error detector 60 to detect there is an error in portion 26-1, it cannot locate which particular bit is erroneous, although it can be detected that state indicating value A it still correct because it has a valid encoding. Again, in this case the error detector 60 may simply signal that there is an error in part of portion 26-1 other than bit A1 of the state indicating value, and may trigger is some other technique for handling the error such as triggering a reset, entry to an error handling mode, or rewind to a previously saved state.

Hence as shown in FIGS. 8 to 11, several different kinds of errors caused by SEUs or MBUs can be detected and often these can be corrected simply by flipping one or more bits of the state indicating value to protect it against signal event or multi event upsets. This approach provides a more area and power efficient technique for protecting against errors caused by particle strikes or other types of event upset.

Figure 12:
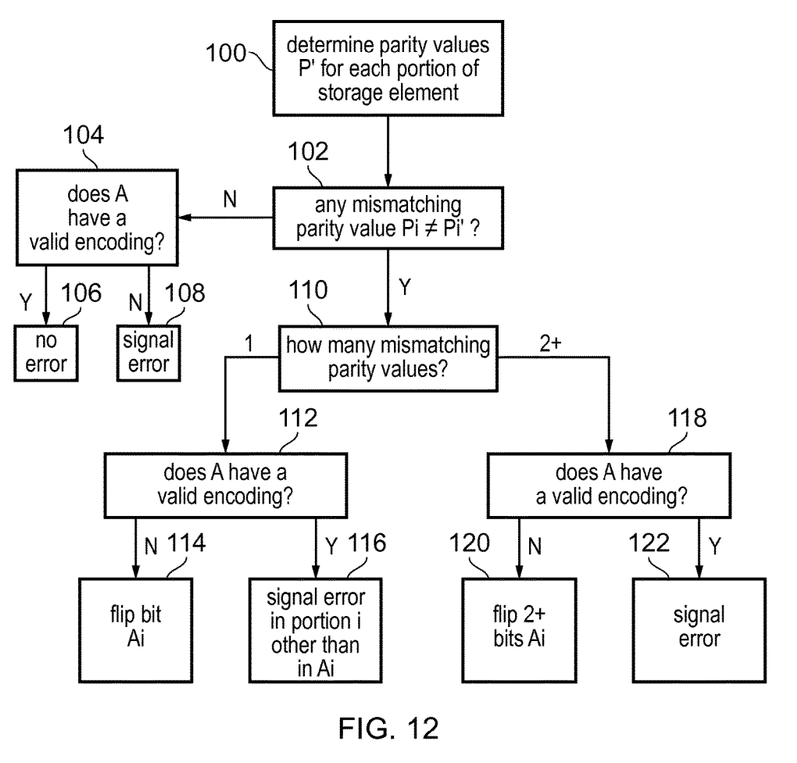
FIG. 12 shows a method of error detection and correction.

FIG. 12 shows a method of determining whether there is an error in the stored state indicating value stored in the storage element 24. At step 100 the parity circuitry 52 determines the detected parity values P' for each portion 26 of the storage element 24. At step 102 the error detector 60 compares the detected parity values P' with the corresponding stored parity values P in the parity storage element 32 and determines whether there is any mismatching parity value. If there are no mismatching parity values then at step 104 the error detector 60 determines from the signal provided by the encoding checker 54 whether the state indicating value A has a valid encoding. If the encoding of A is valid then at step 106 the error detector 60 determines that there is no error. On the other hand, if A has an invalid encoding then at step 108 the error detector 60 signals that there is an error 62, which can be handled by a reset or error handling mode such as the ones discussed above. In this case, the fact that the parity values all match but A has an invalid encoding would signal that as well as a change to at least one bit of the stored state indicating value A there was also a change to another stored bit in the same portion so that the parity value in that portion flipped back to the correct value. In this case, the error can be detected but it may not be clear which particular bit flipped state or what the correct value of the corresponding state indicating bits of value A should be. Nevertheless, in such cases the error can be detected and handled using a more coarse measure such as resetting the device, or restarting processing from an earlier point.

If at step 102 there is at least one mismatching parity value then at step 110 it is determined how many parity values are mismatching. If there is only one mismatching parity value (the case shown in FIG. 8), then at step 112 the error detector 60 determines whether the encoding checker 54 determines the state indicating value A to have a valid encoding. If not, then the single error can be corrected by flipping the bit state of the state indicating bit Ai which corresponds to the portion 26-1 of the storage element 24 for which the parity bits Pi. Pi' did not match. When flipping the bit state of a given bit of the state indicating value, this means that if the currently stored value is 0, it is replaced with 1, while if the currently stored value is 1 then it is set to 0.

On the other hand, if at step 112 the state indicating value A is determined to have a valid encoding (this is the case shown in FIG. 11), then at step 116 the error detector 60 signals that there is an error in portion 26-i of the storage element 24 in a bit other than the bit Ai of the state indicating value.

If at step 110 there are determined to be two or more mismatching parity values, then at step 118 it is again determined whether the state indicating value A has a valid encoding. If not, then at step 120 the multibit upset can be corrected by flipping each of the two or more bits Ai of the state indicating value for which the mismatch of the corresponding parity bits Pi was detected (this is the situation shown in FIG. 9). On the other hand, if A has a valid encoding then at step 122 an error is signalled (this situation shown in FIG. 10).

In summary, this technique allows errors to be detected and allows most errors to be corrected simply by flipping bits, with the remaining errors handled in a coarser fashion, e.g. by triggering a reset, a return to a previous state or entry to an error handling mode. In practice, multi-bit upsets are rare and most particle strikes affect only a single bit and so most errors are of the form shown in FIG. 8 which can be corrected using the present technique.

Figure 13:
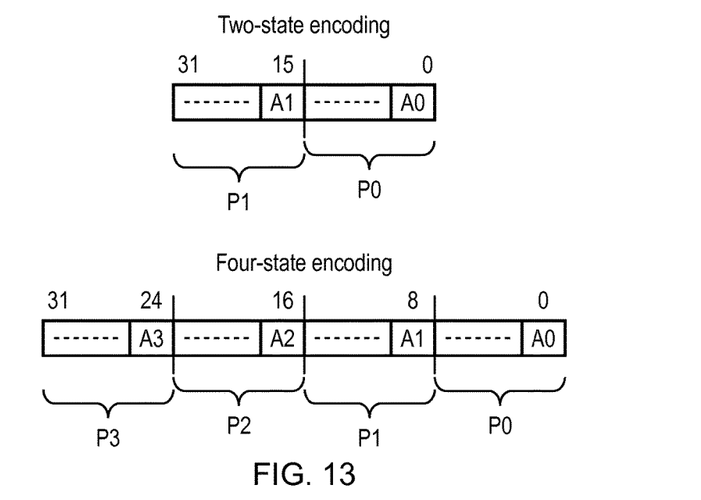
FIG. 13 shows examples of encoded state indicating values with different numbers of states.

The examples above show a four-state encoding in which a state indicating value A has four bits for indicating four different possible states according to a one-hot or one-cold encoding. However, it will be appreciated that this technique could be applied to any number of states. FIG. 13 shows two examples showing encoding of two states and four states respectively.

Figure 14:
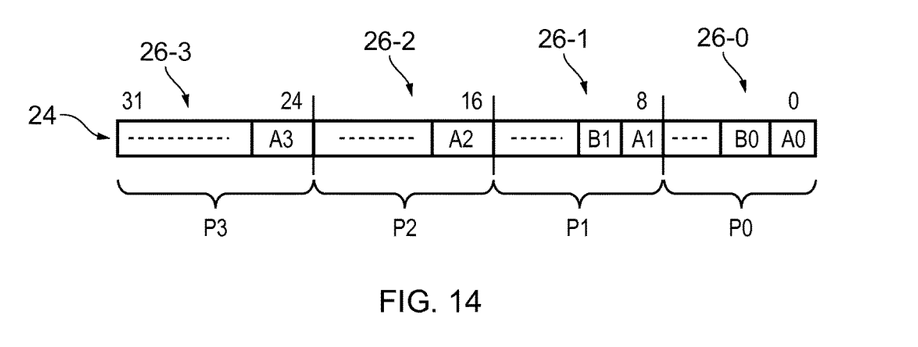
FIG. 14 shows an example of storing first and second state indicating values using a one-hot or one-cold encodings and providing a shared set of parity values.

Also, while the examples above show a single state indicating value A, the present technique can be applied to multiple state indicating values A, B which may be each encoded with a one-hot or one-cold encoding and stored with each bit of the state indicating value in a different portion of the storage element. As shown in FIG. 14, when there are multiple state indicating values A, B to be encoded, the generated parity values P0 to P3 can be shared among the first and second state indicating values A, B so that at least some of the portions of the storage element 24 are shared portions 26-0, 26-1 which include bits from two or more of the state indicating values. Each shared portion 26-0, 26-1 has a single parity bit P0, P1 generated using a combination of all the bits in that portion, including bits from each state indicating values A, B. An error in any one bit can still be detected using the techniques discussed above, because the parity values P can be used to pinpoint which portion 26 of the storage element 24 contains the error, and then which particular state indicating value A, B has the error can be identified by determining which of the values A, B has an invalid encoding using the encoding checker 54. In this way, the overhead of the additional state correcting parity bits can be amortised (shared) between the different state indicating values A, B. The number of parity bits and circuit overhead scales with the maximum number of different states to be represented by any one of the different state indicating values, rather than being duplicated for each different state indicating value. As shown in FIG. 14, this technique can be used even when different state indicating values have different numbers of states. For example, in FIG. 14 a first state indicating value A has a four-state encoding and a second indicating value B has a two state encoding, and so the number of parity bits is four. Hence, this shared approach for representing multiple different state indicating values allows the overhead associated with error protection to be reduced even further. For each of the stored state indicating values A, B, errors can be detected in the same way as shown in FIG. 12.

Figure 15:
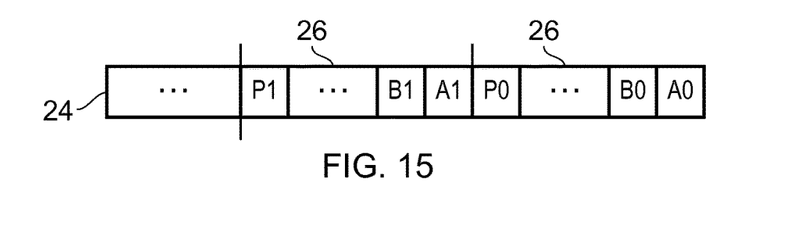
FIG. 15 shows an example in which the parity storage element is a portion of the storage element used to store at least one state indicating value.

The examples above show a separate parity storage element 32 for storing the parity bits P, which is distinct from the storage element 24 which stores the state indicating value itself. However, as shown in FIG. 15 it is also possible for the parity storage element to be a portion of the same storage element 24 used to store the state indicating value A, B. For example, as shown in FIG. 15 each portion 26 of the storage element 24 may also include the corresponding parity bit P.

Figure 16:
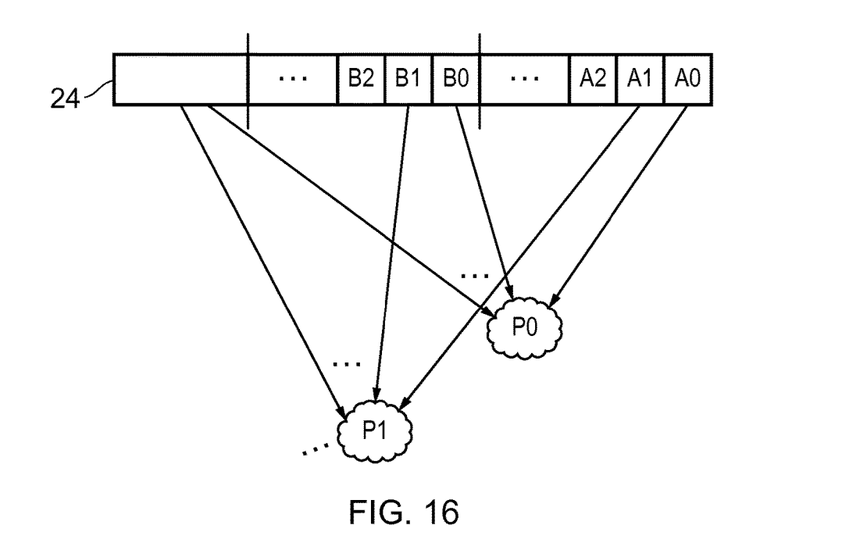
FIG. 16 shows an alternative arrangement of portions of the storage element.

Also, while the examples above show the respective portions 26 of the storage element 24 as comprising blocks of adjacent bits in the storage element 24, this is not essential. The physical or logical layout of the storage element 24 when viewed in hardware or when interpreted by software may vary. In general, each portion of the storage element 24 may simply be a collection of two or more bits which are combined to form the same parity value, regardless of the physical position of the corresponding bitcells or flip-flops in hardware or the logical layout when the register is accessed by software. For example, as shown in FIG. 16 the logical view of the storage element may still perceive the respective state indicating bits of a given state indicating value A, B as being in adjacent positions within the storage element, but the parity values P0, P1 etc. may be formed from non-adjacent sets of bits, so that each group of bits Ai, Bi etc. which combine to form the same parity value Pi may be considered to form one of the portions of the storage element 24.

The storage element 24 discussed above may be any kind of circuitry for storing a data value, such as a register, set of flip-flop, SRAM storage, or any other form of circuitry.

While FIGS. 5 and 7 show separate apparatuses 20, 50 for storing the state indicating value and parity values to the storage element and for detecting or correcting errors in the stored state indicating value, it will be appreciated that many devices may include both the circuitry of FIG. 5 and FIG. 7A. Nevertheless, some devices may only have one or other functionality. For example a device may write a state indicating value to a storage element or memory with the format discussed above, so that a separate device may detect whether that value is erroneous. Similarly, some devices may only have the error checking functionality shown in FIG. 7A but may not have the ability to encode and store values as shown in FIG. 5.

The present technique can be used in system of the type shown in FIG. 1 comprising multiple redundant processing units which each perform the same processing and whose outputs are checked using the checker logic 4. For example, the technique shown above could be used within the checker logic 4 to protect against errors occurring in control registers within the checker logic 4.

The technique shown above can also be used in systems which do not have redundant copies of processors as shown in FIG. 1. Even in a system comprising only a single instance of processing circuitry, without the redundancy shown in FIG. 1, the present technique can still be useful to protect against errors caused by particle strikes.

The examples above discuss use of a one-hot encoding but it will be appreciated that the similar technique could be performed using one-cold encoding simply by flipping the 0s and 1s. In general, regardless of whether the state indicating value has a one-hot or one-cold, the state indicating value may have a valid encoding when only one bit has a first bit value and remaining bits have a second bit value, where the first bit value is one of 0 and 1 and the second bit value is the other of 0 and 1.

The state indicating values discussed above could indicate any information within a processing system. However, the technique is particularly useful for encoding mode indicating values which indicate a current mode of the processing circuitry. Typically mode indicating values have a certain limited number of different possible values representing available modes of processing, and so there will not typically be a large number of different states to be encoded. Therefore, the overhead of encoding a mode indicating value using a one-hot or one-cold encoding is relatively low in this case.

Nevertheless, the same technique can be used for any kind of state indicating value, particularly where the number of available states to be represented is relatively low.

The examples discussed above show the storage element 24 as part of the device 20, 50 performing the storage of the state indicating value or the error checking. However, in other cases the storage element could be an external storage element which is not part of the same device. For example the apparatus may have control circuitry 22 for generating the state indicating value and parity bits and writing these to an external storage element. Likewise the error detecting apparatus 50 could read the state indicating value and parity bits from an external storage element and determine whether there is an error and how to correct it if necessary.

Also, while the examples given above describe correcting the detected errors by flipping bits of the state indicating value, this is not essential in all situations. In some applications it may be enough simply to detect that there is an error, without needing to actually correct it. For example, when an error is detected, a bit value could be flipped on reading the value from the storage element, rather than actually flipping the state of the stored bit.

Also, while FIG. 7A shows an example of error correcting signals 64 where different signals are asserted to control correction of the respective bits of the state indicating value, in other examples the selection of which bits to flip could be represented by a binary encoding. Alternatively, the flipping of the bits could be achieved simply by overwriting the entire register 24 with a new value in which the selected bit has the opposite state compared to the previous bit value. Therefore, there may be a number of ways of implementing such bit flips in hardware and the present technique is not limited to a particular one of these techniques.

FIG. 7A shows the error detector 60 generating an error signal 62 for signalling an error. In some cases, the error signal 62 could be asserted when any error is detected (regardless of whether the error is corrected by flipping one or more bits of the register). In this case, a second signal could also be generated to signal whether the detected error has been corrected. This approach may be preferred if a detection of the error rate is of interest, so that the total number of errors can be identified. Alternatively, in some systems the error signal 62 may be asserted only for errors which cannot be corrected by flipping bits using signals 64. In this case, the error signal 62 may be used to trigger coarser error handling techniques such as a reset, mode change or rewind to earlier state, and SEUs and MBUs which can be corrected simply by flipping bits may not be flagged outside the error detector 60.

Also, FIG. 7A shows an example where the parity circuitry 52 generates detected parity values Pi' for each portion 26 of the register 24 based on the bits within that portion 26, and provides the detected parity values Pi' to the error detector 60 which compares the detected parity values Pi' against the corresponding stored parity values Pi which were generated and stored earlier. However, it is not essential for the parity circuitry 52 to actually generate detected parity values Pi' representing the parity of each portion of the register.

Figure 7B:
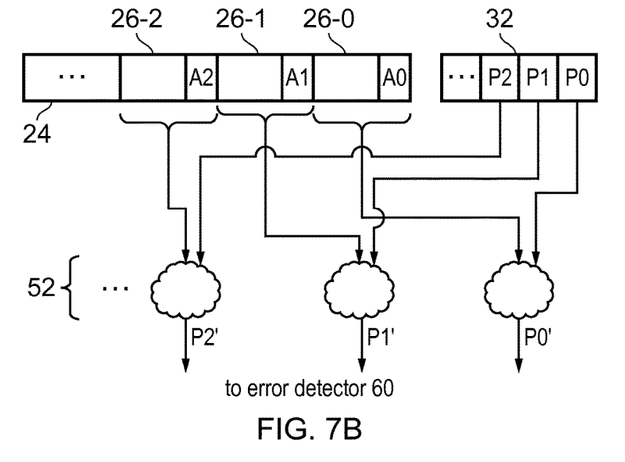
FIG. 7B shows an alternative technique for determining whether the parity of a portion of a storage element matches a stored parity value.

FIG. 7B shows another technique which can be used to determine whether the stored parity value Pi matches the parity of a corresponding portion 26-$i$ of the register 24 ($i$=0, 1, 2, etc.). As shown in FIG. 7B, the parity circuitry 52 may generate parity match signals Pi' which directly indicate whether the parity of the corresponding portion 26 matches the stored parity value Pi, by considering the stored parity value Pi from parity storage element 32 as one of the bits to be combined to form the signal Pi'. Other than considering an additional bit, the parity circuitry 52 generates the parity match signal Pi' in the same way as in FIG. 7A. If there have been no bit flips in a given portion 26-$i$ of the register 24, then the total number of '1' bits among the bits of portion 26-$i$ and the corresponding parity bit Pi will be an even number and so the parity match signal Pi' will be 0. This will be the case regardless of whether the data in portion 26-$i$ itself has an even or odd number of '1' bits, for example:

| Data 26-$i$ | Even Parity Bit Pi | Parity match signal Pi' |
|---|---|---|
| 0011 | 0 | 0 |
| 1011 | 1 | 0 |

On the other hand, if there has been a bit flip in data 26-$i$, then the total number of '1' bits among the bits of data 26-$i$ and the corresponding parity bit Pi would be an odd number, so the corresponding parity match signal Pi' is 1:

| Data 26-$i$ | Even Parity Bit Pi | Parity match signal Pi' |
|---|---|---|
| 1011 | 0 | 1 |
| 1001 | 1 | 1. |

Hence, in this embodiment the error detector 60 can detect whether there is a mismatching parity value directly from the parity match signals Pi' output by parity circuitry 52, and so there would be no need for any further comparator within error detector 60 for comparing the result of parity circuitry 52 against the stored parity values 32 as in the approach used in FIG. 7A.

The examples above show various hardware implementations for performing the present technique with dedicated circuitry.

However, it is also possible to implement similar techniques in software using a general purpose data processing apparatus. A computer program running on the data processing apparatus may generate a one-hot or one-cold encoded state indicating value and generate corresponding parity bits as shown in FIG. 5. Similarly, the software may analyse the stored state indicating value and the stored parity bits as in FIG. 7A to detect whether there is an error and determine how to correct it.

Figure 17:
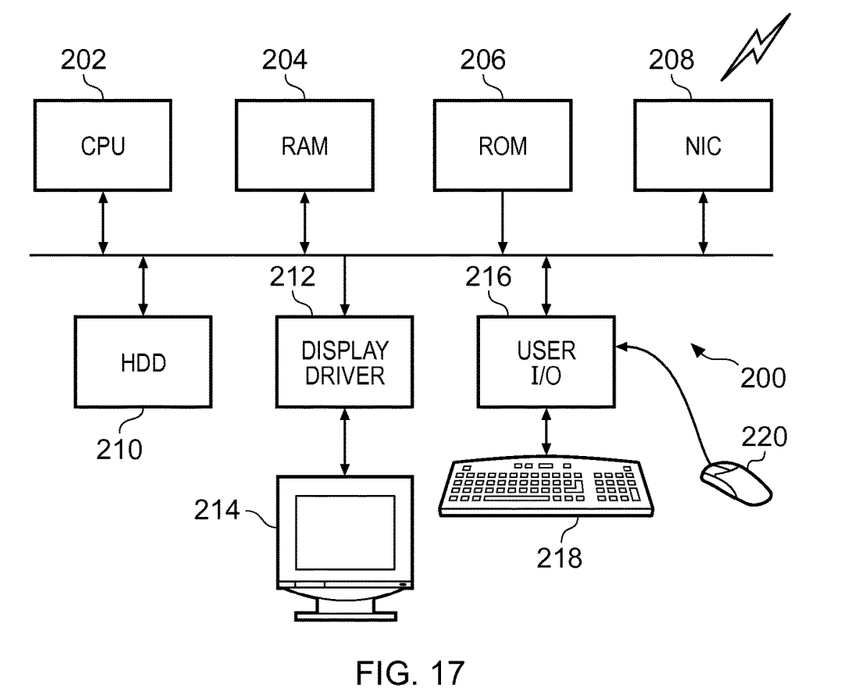
FIG. 17 shows an example of a data processing apparatus for performing the methods of FIGS. 6 and 12.

FIG. 17 shows an example of a general purpose computer which could be used to execute the software. FIG. 17 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 17 is only one example.

Alternatively, the above-described techniques may be implemented in a more distributed fashion, wherein the general purpose computer 200 illustrated in FIG. 17 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

Hence, a computer program may be provided for controlling a general purpose data processing apparatus 200 to perform the method of FIG. 6 or FIG. 12. The program may be stored on a computer-readable storage medium. The storage medium may be a non-transitory storage medium.

In the present application, the words "configured to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   control circuitry to generate a first state indicating value according to a one-hot or one-cold encoding comprising a plurality of state indicating bits, and to store each state indicating bit of the first state indicating value in a different one of a plurality of portions of a storage element;
   parity circuitry to determine a plurality of parity values each indicative of a parity of a corresponding one of said plurality of portions of the storage element, and to store the parity values to a parity storage element, wherein the parity circuitry is configured to determine the plurality of parity values with each of the plurality of state indicating bits of the first state indicating value being used for the determination of a different one of the parity values; and
   single event upset error checking circuitry to detect a single-event upset error based on the first state indicating value and the plurality of parity values.

2. The apparatus according to claim 1, wherein the single event upset error checking circuitry to detect whether the first state indicating value stored in the storage element has a valid encoding.

3. The apparatus according to claim 2, wherein the single event upset error checking circuitry is configured to determine that the first state indicating value has a valid encoding when only one of the plurality of state indicating bits has a first bit value and at least one remaining bit of the plurality of state indicating bits has a second bit value.

4. The apparatus according to claim 2, wherein the single event upset error checking circuitry is configured to detect at least one mismatching parity value for which there is a mismatch between that parity value and a parity of the corresponding portion of the storage element.

5. The apparatus according to claim 4, wherein in response to detecting said at least one mismatching parity value and detecting that the first state indicating value has an invalid encoding, the single event upset error checking circuitry is configured to identify at least one erroneous state indicating bit that is stored in at least one portion of the storage element corresponding to said at least one mismatching parity value.

6. The apparatus according to claim 5, wherein the single event upset error checking circuitry is configured to correct said at least one erroneous state indicating bit by switching each erroneous state indicating bit between a first bit value and a second bit value.

7. The apparatus according to claim 5, wherein in response to detecting a plurality of said mismatching parity values and detecting that the first state indicating value has an invalid encoding, the single event upset error checking circuitry is configured to correct a plurality of erroneous state indicating bits by switching each erroneous state indicating bit between a first bit value and a second bit value.

8. The apparatus according to claim 4, wherein in response to the single event upset error checking circuitry detecting only one mismatching parity value, and detecting that the first state indicating value has a valid encoding, the single event upset error checking circuitry is configured to signal that the portion of the storage element corresponding to said one mismatching parity value comprises an erroneous bit other than one of said plurality of state indicating bits of the first state indicating value.

9. The apparatus according to claim 1, wherein the control circuitry is configured to encode a second state indicating value according to said one-hot or one-cold encoding comprising a plurality of state indicating bits, and to store each state indicating bit of the second state indicating value in a different one of said plurality of portions of the storage element, and
   the plurality of portions of the storage element include at least one shared portion for storing state indicating bits for both the first and second state indicating values.

10. The apparatus according to claim 9, wherein for each shared portion of the storage element, the parity circuitry is configured to determine a single parity value indicative of the parity of a plurality of bits of the shared portion including the state indicating bits for both the first and second state indicating values.

11. The apparatus according to claim 1, wherein the parity storage element comprises a portion of the storage element.

12. The apparatus according to claim 1, wherein the first state indicating value comprises a mode indicating value indicative of a current mode of processing circuitry.

13. The apparatus according to claim 1, comprising said storage element.

* * * * *